(12) United States Patent
Kanai et al.

(10) Patent No.: US 11,681,576 B2
(45) Date of Patent: Jun. 20, 2023

(54) ANOMALY COPING SUPPORT APPARATUS, METHOD, AND PROGRAM

(71) Applicant: Nippon Telegraph and Telephone Corporation, Tokyo (JP)

(72) Inventors: Shunsuke Kanai, Musashino (JP); Haruhisa Nozue, Musashino (JP); Satoshi Suzuki, Musashino (JP); Fumika Asai, Musashino (JP); Naomi Murata, Musashino (JP); Kazuaki Akashi, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/760,681

(22) PCT Filed: Sep. 25, 2019

(86) PCT No.: PCT/JP2019/037577
§ 371 (c)(1),
(2) Date: Mar. 15, 2022

(87) PCT Pub. No.: WO2021/059396
PCT Pub. Date: Apr. 1, 2021

(65) Prior Publication Data
US 2022/0334914 A1 Oct. 20, 2022

(51) Int. Cl.
*G06F 11/07* (2006.01)

(52) U.S. Cl.
CPC ........ *G06F 11/0793* (2013.01); *G06F 11/079* (2013.01); *G06F 11/0709* (2013.01)

(58) Field of Classification Search
CPC . G06F 11/0793; G06F 11/0709; G06F 11/079
See application file for complete search history.

(56) References Cited

U.S. PATENT DOCUMENTS

| 2012/0035777 A1* | 2/2012 | Park | H02J 13/00004 700/291 |
| 2014/0074670 A1* | 3/2014 | Garrity | G06Q 50/06 705/30 |

FOREIGN PATENT DOCUMENTS

JP 2018028778 2/2018

* cited by examiner

*Primary Examiner* — Jigar P Patel
(74) *Attorney, Agent, or Firm* — Fish & Richardson P.C.

(57) ABSTRACT

In an embodiment of the present disclosure, a prior probability is used by an approach of Bayesian statistics, for all nodes stored in fault handling history data or for a target node for which a fault cause has been identified and all nodes of the same type as the target node, restoration probabilities of handling methods for an identical fault cause are calculated, priorities are set for the handling methods based on the calculated restoration probabilities, and a handling method to be presented is determined in accordance with the priorities.

12 Claims, 11 Drawing Sheets

| NODE TYPE | FAULT CAUSE | HANDLING | NUMBER OF RESTORATION CASES | BAYESIAN STATISTICS (PATTERN 1) | |
|---|---|---|---|---|---|
| | | | | PROBABILITY | PRIORITY |
| ROUTER | FAULT CAUSE X1 | HANDLING A1 | 5 | 26% | 1 |
| | | HANDLING A2 | 4 | 26% | 2 |
| | | HANDLING A3 | 3 | 26% | 3 |
| | | HANDLING A4 | 1 | 21% | 4 |
| | FAULT CAUSE X2 | HANDLING B1 | 0 | 67% | 1 |
| | | HANDLING B2 | 0 | 8% | 3 |
| | | HANDLING B3 | 0 | 17% | 2 |
| | | HANDLING B4 | 1 | 8% | 4 |
| SERVER | FAULT CAUSE X1 | HANDLING A1 | 0 | 26% | 1 |
| | | HANDLING A2 | 1 | 26% | 2 |
| | | HANDLING A3 | 2 | 26% | 3 |
| | | HANDLING A4 | 3 | 21% | 4 |
| | FAULT CAUSE X2 | HANDLING B1 | 8 | 67% | 1 |
| | | HANDLING B2 | 1 | 8% | 3 |
| | | HANDLING B3 | 2 | 17% | 2 |
| | | HANDLING B4 | 0 | 8% | 4 |

Fig. 8

| NODE TYPE | FAULT CAUSE | HANDLING | NUMBER OF RESTORATION CASES | FREQUENCY STATISTICS ||
|---|---|---|---|---|---|
| | | | | PROBABILITY | PRIORITY |
| ROUTER | FAULT CAUSE X1 | HANDLING A1 | 5 | 38% | 1 |
| | | HANDLING A2 | 4 | 31% | 2 |
| | | HANDLING A3 | 3 | 23% | 3 |
| | | HANDLING A4 | 1 | 8% | 4 |
| | FAULT CAUSE X2 | HANDLING B1 | 0 | 0% | 2 |
| | | HANDLING B2 | 0 | 0% | 3 |
| | | HANDLING B3 | 0 | 0% | 4 |
| | | HANDLING B4 | 1 | 100% | 1 |
| SERVER | FAULT CAUSE X1 | HANDLING A1 | 0 | 0% | 4 |
| | | HANDLING A2 | 1 | 17% | 3 |
| | | HANDLING A3 | 2 | 33% | 2 |
| | | HANDLING A4 | 3 | 50% | 1 |
| | FAULT CAUSE X2 | HANDLING B1 | 8 | 73% | 1 |
| | | HANDLING B2 | 1 | 9% | 3 |
| | | HANDLING B3 | 2 | 18% | 2 |
| | | HANDLING B4 | 0 | 0% | 4 |

Fig. 9

| NODE TYPE | FAULT CAUSE | HANDLING | NUMBER OF RESTORATION CASES | BAYESIAN STATISTICS (PATTERN 2) | |
|---|---|---|---|---|---|
| | | | | PROBABILITY | PRIORITY |
| ROUTER 1 | FAULT CAUSE X1 | HANDLING A1 | 7 | 32% | 1 |
| | | HANDLING A2 | 5 | 27% | 2 |
| | | HANDLING A3 | 3 | 18% | 4 |
| | | HANDLING A4 | 1 | 23% | 3 |
| | FAULT CAUSE X2 | HANDLING B1 | 0 | 0% | 4 |
| | | HANDLING B2 | 0 | 14% | 3 |
| | | HANDLING B3 | 0 | 29% | 2 |
| | | HANDLING B4 | 1 | 57% | 1 |
| SERVER | FAULT CAUSE X1 | HANDLING A1 | 0 | 0% | 4 |
| | | HANDLING A2 | 2 | 18% | 3 |
| | | HANDLING A3 | 3 | 27% | 2 |
| | | HANDLING A4 | 6 | 55% | 1 |
| | FAULT CAUSE X2 | HANDLING B1 | 4 | 40% | 1 |
| | | HANDLING B2 | 1 | 10% | 4 |
| | | HANDLING B3 | 3 | 30% | 2 |
| | | HANDLING B4 | 2 | 20% | 3 |
| ROUTER 2 | FAULT CAUSE X1 | HANDLING A1 | 0 | 32% | 1 |
| | | HANDLING A2 | 1 | 27% | 2 |
| | | HANDLING A3 | 1 | 18% | 4 |
| | | HANDLING A4 | 4 | 23% | 3 |
| | FAULT CAUSE X2 | HANDLING B1 | 0 | 0% | 4 |
| | | HANDLING B2 | 1 | 14% | 3 |
| | | HANDLING B3 | 2 | 29% | 2 |
| | | HANDLING B4 | 3 | 57% | 1 |

Fig. 10

| APPARATUS TYPE | NODE NUMBER | FAULT CAUSE (Xm) | HANDLING CONTENT (An) | HANDLING RESULT (RECOVERY) | EXISTING TECHNIQUE | | EMBODIMENT (PATTERN 1) | | EMBODIMENT (PATTERN 2) | |
|---|---|---|---|---|---|---|---|---|---|---|
| | | TOPOLOGY CONFIGURATION AND HANDLING PERFORMANCE | | | RESTORATION PROBABILITY | PRIORITY | RESTORATION PROBABILITY | PRIORITY | RESTORATION PROBABILITY | PRIORITY |
| NW EQUIPMENT 1 | 1 | CHASSIS FAULT | RESTART | 1 | 13% | 3 | 20% | 3 | 20% | 3 |
| NW EQUIPMENT 1 | 1 | CHASSIS FAULT | HARDWARE REPLACEMENT | 2 | 25% | 2 | 27% | 1 | 27% | 1 |
| NW EQUIPMENT 1 | 1 | CHASSIS FAULT | LOAD DISTRIBUTION | 3 | 38% | 1 | 27% | 2 | 27% | 2 |
| NW EQUIPMENT 1 | 1 | CHASSIS FAULT | CABLE REPLACEMENT | 1 | 13% | 4 | 20% | 4 | 20% | 4 |
| NW EQUIPMENT 1 | 1 | CHASSIS FAULT | SETTING ERROR | 1 | 13% | 5 | 7% | 5 | 7% | 5 |
| NW EQUIPMENT 1 | 1 | CARD FAULT | RESTART | | 0% | 2 | 25% | 1 | 25% | 1 |
| NW EQUIPMENT 1 | 1 | CARD FAULT | HARDWARE REPLACEMENT | 1 | 100% | 1 | 25% | 2 | 25% | 2 |
| NW EQUIPMENT 1 | 1 | CARD FAULT | LOAD DISTRIBUTION | | 0% | 3 | 0% | 5 | 0% | 5 |
| NW EQUIPMENT 1 | 1 | CARD FAULT | CABLE REPLACEMENT | | 0% | 4 | 25% | 3 | 25% | 3 |
| NW EQUIPMENT 1 | 1 | CARD FAULT | SETTING ERROR | | 0% | 5 | 25% | 4 | 25% | 4 |
| NW EQUIPMENT 1 | 1 | UNIT FAULT | RESTART | | 0% | 4 | 0% | 4 | 0% | 4 |
| NW EQUIPMENT 1 | 1 | UNIT FAULT | HARDWARE REPLACEMENT | 1 | 33% | 1 | 50% | 1 | 50% | 1 |
| NW EQUIPMENT 1 | 1 | UNIT FAULT | LOAD DISTRIBUTION | 1 | 33% | 2 | 33% | 2 | 33% | 2 |
| NW EQUIPMENT 1 | 1 | UNIT FAULT | CABLE REPLACEMENT | 1 | 33% | 3 | 17% | 3 | 17% | 3 |
| NW EQUIPMENT 1 | 1 | UNIT FAULT | SETTING ERROR | | 0% | 5 | 0% | 5 | 0% | 5 |
| NW EQUIPMENT 1 | 2 | CHASSIS FAULT | RESTART | 2 | 29% | 1 | 20% | 3 | 20% | 3 |
| NW EQUIPMENT 1 | 2 | CHASSIS FAULT | HARDWARE REPLACEMENT | 2 | 29% | 2 | 27% | 1 | 27% | 1 |
| NW EQUIPMENT 1 | 2 | CHASSIS FAULT | LOAD DISTRIBUTION | 1 | 14% | 4 | 27% | 2 | 27% | 2 |
| NW EQUIPMENT 1 | 2 | CHASSIS FAULT | CABLE REPLACEMENT | 2 | 29% | 3 | 20% | 4 | 20% | 4 |
| NW EQUIPMENT 1 | 2 | CHASSIS FAULT | SETTING ERROR | | 0% | 5 | 7% | 5 | 7% | 5 |
| NW EQUIPMENT 1 | 2 | CARD FAULT | RESTART | 1 | 50% | 1 | 25% | 1 | 25% | 1 |
| NW EQUIPMENT 1 | 2 | CARD FAULT | HARDWARE REPLACEMENT | | 0% | 3 | 25% | 2 | 25% | 2 |
| NW EQUIPMENT 1 | 2 | CARD FAULT | LOAD DISTRIBUTION | | 0% | 4 | 0% | 5 | 0% | 5 |
| NW EQUIPMENT 1 | 2 | CARD FAULT | CABLE REPLACEMENT | | 0% | 5 | 25% | 3 | 25% | 3 |
| NW EQUIPMENT 1 | 2 | CARD FAULT | SETTING ERROR | 1 | 50% | 2 | 25% | 4 | 25% | 4 |
| NW EQUIPMENT 1 | 2 | UNIT FAULT | RESTART | | 0% | 2 | 0% | 4 | 0% | 4 |
| NW EQUIPMENT 1 | 2 | UNIT FAULT | HARDWARE REPLACEMENT | | 0% | 3 | 50% | 1 | 50% | 1 |
| NW EQUIPMENT 1 | 2 | UNIT FAULT | LOAD DISTRIBUTION | 1 | 100% | 1 | 33% | 2 | 33% | 2 |
| NW EQUIPMENT 1 | 2 | UNIT FAULT | CABLE REPLACEMENT | | 0% | 4 | 17% | 3 | 17% | 3 |
| NW EQUIPMENT 1 | 2 | UNIT FAULT | SETTING ERROR | | 0% | 5 | 0% | 5 | 0% | 5 |
| NW EQUIPMENT 1 | 3 | CHASSIS FAULT | RESTART | | 0% | 1 | 20% | 3 | 20% | 3 |
| NW EQUIPMENT 1 | 3 | CHASSIS FAULT | HARDWARE REPLACEMENT | | 0% | 2 | 27% | 1 | 27% | 1 |
| NW EQUIPMENT 1 | 3 | CHASSIS FAULT | LOAD DISTRIBUTION | | 0% | 3 | 27% | 2 | 27% | 2 |
| NW EQUIPMENT 1 | 3 | CHASSIS FAULT | CABLE REPLACEMENT | | 0% | 4 | 20% | 4 | 20% | 4 |
| NW EQUIPMENT 1 | 3 | CHASSIS FAULT | SETTING ERROR | | 0% | 5 | 7% | 5 | 7% | 5 |
| NW EQUIPMENT 1 | 3 | CARD FAULT | RESTART | | 0% | 2 | 25% | 1 | 25% | 1 |
| NW EQUIPMENT 1 | 3 | CARD FAULT | HARDWARE REPLACEMENT | | 0% | 3 | 25% | 2 | 25% | 2 |
| NW EQUIPMENT 1 | 3 | CARD FAULT | LOAD DISTRIBUTION | | 0% | 4 | 0% | 5 | 0% | 5 |
| NW EQUIPMENT 1 | 3 | CARD FAULT | CABLE REPLACEMENT | 1 | 100% | 1 | 25% | 3 | 25% | 3 |
| NW EQUIPMENT 1 | 3 | CARD FAULT | SETTING ERROR | | 0% | 5 | 25% | 4 | 25% | 4 |
| NW EQUIPMENT 1 | 3 | UNIT FAULT | RESTART | | 0% | 2 | 0% | 4 | 0% | 4 |
| NW EQUIPMENT 1 | 3 | UNIT FAULT | HARDWARE REPLACEMENT | 2 | 100% | 1 | 50% | 1 | 50% | 1 |
| NW EQUIPMENT 1 | 3 | UNIT FAULT | LOAD DISTRIBUTION | | 0% | 3 | 33% | 2 | 33% | 2 |
| NW EQUIPMENT 1 | 3 | UNIT FAULT | CABLE REPLACEMENT | | 0% | 4 | 17% | 3 | 17% | 3 |
| NW EQUIPMENT 1 | 3 | UNIT FAULT | SETTING ERROR | | 0% | 5 | 0% | 5 | 0% | 5 |

Fig. 11

| No | SIMULATION INFORMATION | | | | EXISTING TECHNIQUE | | EMBODIMENT (PATTERN 1) | | EMBODIMENT (PATTERN 2) | |
|---|---|---|---|---|---|---|---|---|---|---|
| | APPARATUS TYPE | NODE NUMBER | FAULT CAUSE | HANDLING CONTENT (CORRECT SOLUTION) | PERIOD OF TIME UNTIL RESTORATION | NUMBER OF EXECUTION TIMES UNTIL RESTORATION | PERIOD OF TIME UNTIL RESTORATION | NUMBER OF EXECUTION TIMES UNTIL RESTORATION | PERIOD OF TIME UNTIL RESTORATION | NUMBER OF EXECUTION TIMES UNTIL RESTORATION |
| 1 | NW EQUIPMENT 1 | 1 | CHASSIS FAULT | LOAD DISTRIBUTION | 40 | 3 | | | | |
| 2 | NW EQUIPMENT 1 | 2 | CHASSIS FAULT | LOAD DISTRIBUTION | 70 | 4 | 70 | 4 | 70 | 4 |
| 3 | NW EQUIPMENT 1 | 2 | CARD FAULT | SETTING ERROR | 110 | 5 | 70 | 4 | 70 | 4 |
| 4 | NW EQUIPMENT 1 | 1 | CHASSIS FAULT | CABLE REPLACEMENT | 110 | 5 | 110 | 5 | 110 | 5 |
| 5 | NW EQUIPMENT 1 | 2 | CHASSIS FAULT | RESTART | 45 | 3 | 40 | 2 | 40 | 2 |
| 6 | NW EQUIPMENT 1 | 2 | CHASSIS FAULT | HARDWARE REPLACEMENT | 40 | 2 | 45 | 3 | 45 | 3 |
| 7 | NW EQUIPMENT 1 | 2 | UNIT FAULT | LOAD DISTRIBUTION | 40 | 3 | 10 | 1 | 10 | 1 |
| 8 | NW EQUIPMENT 1 | 1 | CHASSIS FAULT | LOAD DISTRIBUTION | 40 | 3 | 35 | 2 | 35 | 2 |
| 9 | NW EQUIPMENT 1 | 1 | UNIT FAULT | HARDWARE REPLACEMENT | 70 | 4 | 70 | 4 | 70 | 4 |
| 10 | NW EQUIPMENT 1 | 2 | CHASSIS FAULT | RESTART | 45 | 3 | 10 | 1 | 10 | 1 |
| | | | | | | | 45 | 3 | 45 | 3 |
| | TOTAL | | | | 610 | 35 | 505 | 29 | 505 | 29 |

ANOMALY COPING SUPPORT APPARATUS, METHOD, AND PROGRAM

CROSS-REFERENCE TO RELATED APPLICATIONS

This application is a National Stage application under 35 U.S.C. § 371 of International Application No. PCT/JP2019/037577, having an International Filing Date of Sep. 25, 2019. The disclosure of the prior application is considered part of the disclosure of this application, and is incorporated in its entirety into this application.

TECHNICAL FIELD

One aspect of the disclosure relates to an anomaly handling support apparatus, a method, and a program that support handling of an anomaly when the anomaly such as a fault or a failure occurs in an apparatus connected to a communication network, for example.

BACKGROUND ART

There have been proposed various techniques for estimating an anomaly occurrence location when an anomaly such as a fault or a failure occurs in an apparatus such as a router or a server connected to a network. For example, PTL 1 discloses a technique in which a unique combination of failure events is extracted for each failure case so as not to overlap with other failure cases registered in a failure case database and the unique combination is used as a characteristic failure event to automatically create and modify a rule by which a failure factor location can be determined. Furthermore, in order to assist in restoration of a target apparatus identified as the failure factor location, there is also provided a technique in which a handling method is selected and presented in an order of priority based on execution frequencies of handling methods in the target apparatus in the past, for example.

CITATION LIST

Patent Literature

PTL 1: JP 2018-28778 A

SUMMARY OF THE INVENTION

Technical Problem

However, as to the execution frequencies of handling methods, when there is deviation for each apparatus or the number of execution times of handling methods in a target apparatus in the past is small, the order of priority set for handling methods does not correspond to actual execution frequencies of the handling methods, a handling method with a low execution frequency is preferentially executed, and as a result, a period of time required to complete the handling may be longer.

One aspect of the present disclosure has been made in view of the above circumstances and is directed to providing a technique capable of presenting an optimal handling method for an anomaly occurrence.

Means for Solving the Problem

In order to solve the above-described problems, in one aspect of an anomaly handling support apparatus, a method, and a program according to the present disclosure, pieces of anomaly handling performance information for a plurality of apparatuses connected to a network are stored. Then, information representing an identification result of an anomaly cause related to an apparatus in which an anomaly is occurred among the plurality of apparatuses is acquired, based on the pieces of anomaly handling performance information that are stored, by a statistical approach using a prior probability, for a plurality of apparatuses in a predetermined range including the apparatus for which the anomaly cause is identified, restoration probabilities of anomaly causes are calculated for a plurality of handling methods corresponding to the anomaly causes of the plurality of apparatuses in the predetermined range, degrees of priority are set for the plurality of handling methods based on the restoration probabilities that are calculated, a handling method of the plurality of handling methods for the apparatus for which the anomaly cause is identified is determined based on the degrees of priority that are set, and information representing the handling method that is determined is output.

Effects of the Invention

According to one aspect of the present disclosure, it is possible to provide a technique capable of presenting an optimal handling method for an anomaly occurrence.

BRIEF DESCRIPTION OF DRAWINGS

FIG. 10 is a diagram showing specific examples of processing results by the first pattern and the second pattern of the handling method determination processing illustrated in FIGS. 5 and 6 compared with processing results by an existing technique.

DESCRIPTION OF EMBODIMENTS

Hereinafter, embodiments of the present disclosure will be described with reference to the drawings.

EMBODIMENT

Configuration Example

Figure 1:
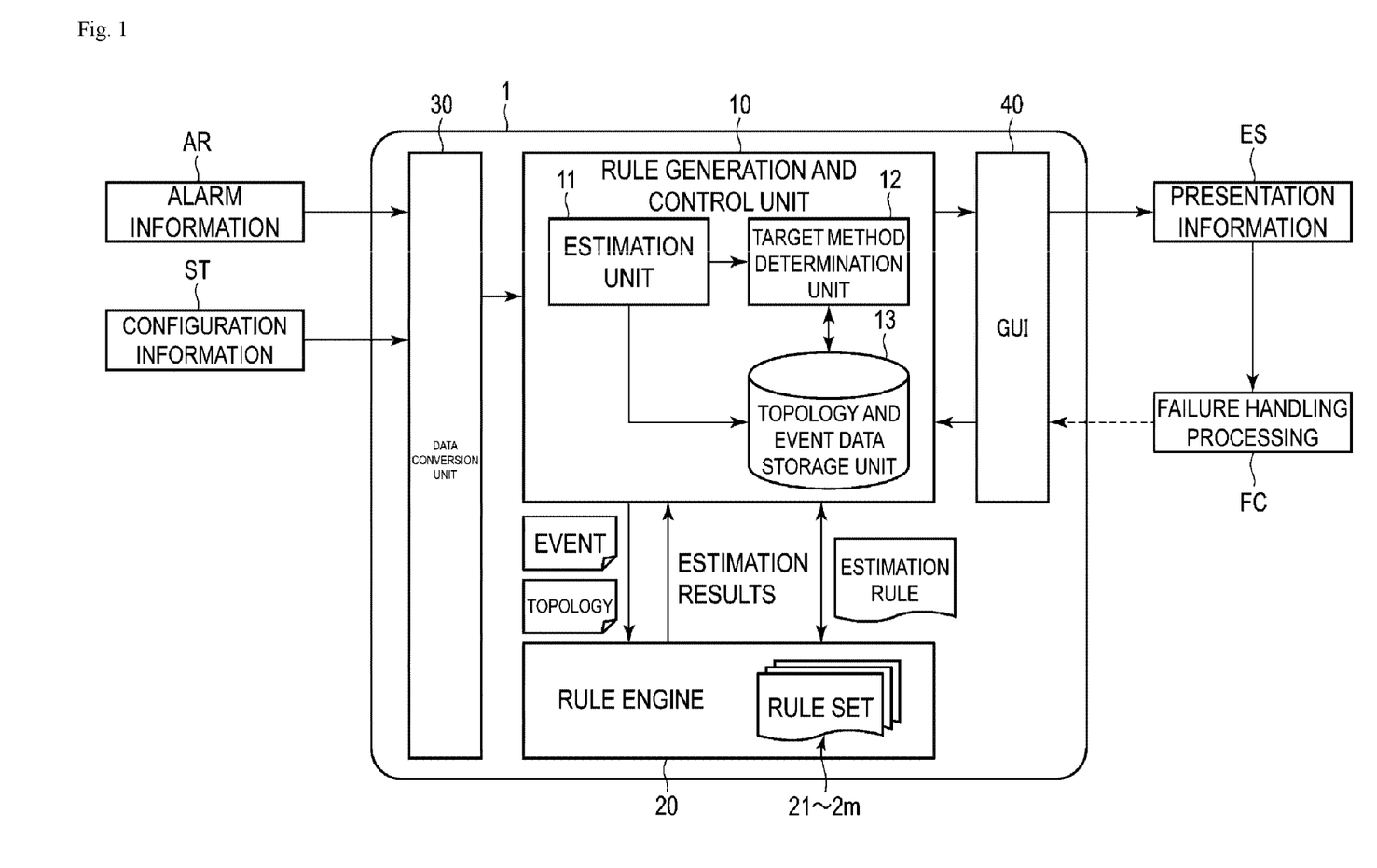
FIG. 1 is a block diagram illustrating a software configuration of an anomaly handling support apparatus according to an embodiment of the present disclosure.
Figure 2:
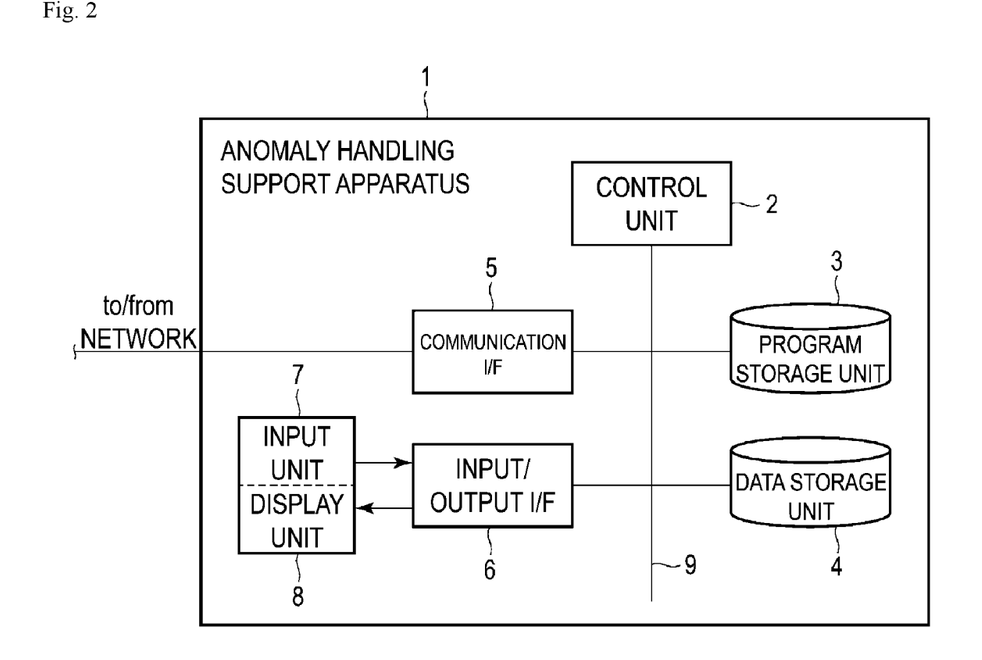
FIG. 2 is a block diagram illustrating a hardware configuration of the anomaly handling support apparatus according to the embodiment of the present disclosure.

FIGS. 1 and 2 are block diagrams illustrating examples of a software configuration and a hardware configuration of an anomaly handling support apparatus according to an embodiment of the present disclosure, respectively.

An anomaly handling support apparatus 1 is provided in, for example, a management apparatus capable of communicating with an apparatus such as a router or a server (hereinafter also referred to as a node) connected to a communication network, or a maintenance terminal, and is composed of a server computer or a personal computer. As illustrated in FIG. 2, the anomaly handling support apparatus 1 is an apparatus in which a program storage unit 3, a data storage unit 4, a communication interface unit (communication I/F) 5, and an input/output interface unit (input/output I/F) 6 are connected to a control unit 2 having a central processing unit (CPU) via a bus 9.

The communication I/F 5 performs communication with a plurality of nodes connected to a network and a configuration information database (not illustrated) that stores information representing a connection configuration between these nodes, and acquires alarm information AR generated by each node and network configuration information stored in the configuration information database.

An input unit 7 and a display unit 8 are connected to the input/output I/F 6. As the input unit 7 and the display unit 8, for example, a so-called tablet type input and display device in which an input detection sheet adopting an electrostatic scheme or a pressure scheme is disposed on a display screen of a display device using liquid crystal or organic electro luminescence (EL) is used. Note that the input unit 7 and the display unit 8 may be constituted by independent devices. The input/output I/F 6 inputs operation information input in the above-described input unit 7 to the control unit 2 and causes the display unit 8 to display the display information generated in the control unit 2.

The program storage unit 3 and the data storage unit 4 are configured by combining a non-volatile memory in which writing and reading can be performed any time, such as a hard disk drive (HDD) or a solid state drive (SSD), a non-volatile memory such as a read only memory (ROM), and a volatile memory such as a random access memory (RAM), for example. A program necessary to execute various kinds of control processing according to the embodiment of the present disclosure is stored in the program storage unit 3. The data storage unit 4 is provided with a topology and event data storage unit 13, a storage unit for rule sets 21 to 2n described below, and a working memory that temporarily stores data generated in the process of various kinds of processing.

The anomaly handling support apparatus 1 includes a rule generation and control unit 10, a rule engine 20, a data conversion unit 30, and a GUI 40 as an input/output I/F. Of these, the data conversion unit 30 data-converts the alarm information AR generated from each node to be monitored into event information, and data-converts configuration information ST of the network acquired from the configuration information database (not illustrated) into topology information.

The rule generation and control unit 10 includes an estimation unit 11 that identifies a fault cause, a handling method determination unit 12 that determines a handling method for the fault cause, and a topology and event data storage unit 13 used as a failure case database.

The failure case database of the topology and event data storage unit 13 includes the number of restoration cases in the past when a plurality of handling methods were applied to each fault cause per node type and information representing a restoration probability and a priority for each of the handling methods calculated by the handling method determination unit 12 described below. An example of this failure case database will be described below.

The rule engine 20 manages one or more rule sets 21 to 2n. The rule set includes a condition part and a conclusion part. In this example, the condition part is a failure event including a fault or the like, and includes, for example, an apparatus ID and an alarm type. The conclusion part is fault cause identification information and includes an apparatus ID and a type of a fault cause.

The estimation unit 11 selectively applies the rule sets 21 to 2n managed by the rule engine 20 to the event information and the topology information provided from the data conversion unit 30 to perform estimation processing of a fault cause. Furthermore, when the estimation by the existing rule sets 21 to 2n has failed, the estimation unit 11 extracts a unique combination of failure events from the event information, uses the extracted unique combination as a condition part and fault cause identification information registered by a maintenance personnel as a conclusion part to perform learning processing, and newly generates a rule. The newly generated rule is then added to the rule sets 21 to 2n of the rule engine 20, and the rule ID of the newly created rule is associated with a fault ID and stored in the topology and event data storage unit 13.

The handling method determination unit 12 uses a prior probability of Bayesian statistics, and calculates a restoration probability for each handling method per fault cause or per fault cause and node type based on fault handling history data stored in the topology and event data storage unit 13. In addition, the handling method determination unit 12 performs processing of giving a priority to each handling method based on the calculated restoration probability and determining a handling method to be presented based on this priority.

The GUI 40 causes the display unit 8 to display presentation information ES representing the handling method for the fault cause determined by the handling method determination unit 12. In addition, the GUI 40 receives failure factor information FC related to failure handling input from the input unit 7 by, for example, the maintenance personnel based on the presentation information ES representing the displayed handling method and inputs the failure factor information FC to the rule generation and control unit 10.

Operation Example

Next, an operation of the anomaly handling support apparatus 1 configured as described above will be described.

Figure 3:
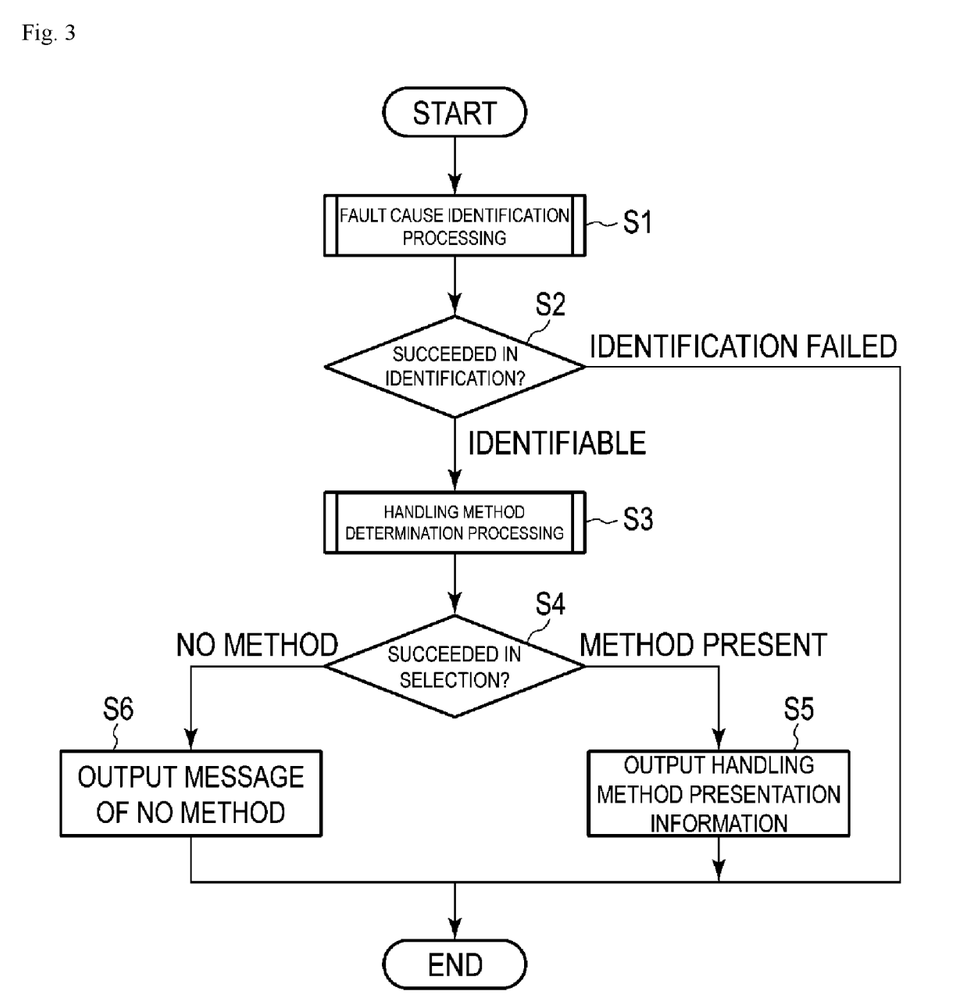
FIG. 3 is a flowchart illustrating an overall processing procedure and processing contents of anomaly handling support processing in the anomaly handling support apparatus illustrated in FIG. 1.

FIG. 3 is a flowchart illustrating an overall processing procedure and processing contents of an anomaly handling support operation by the anomaly handling support apparatus 1.

(1) Fault Cause Identification Processing

Figure 4:
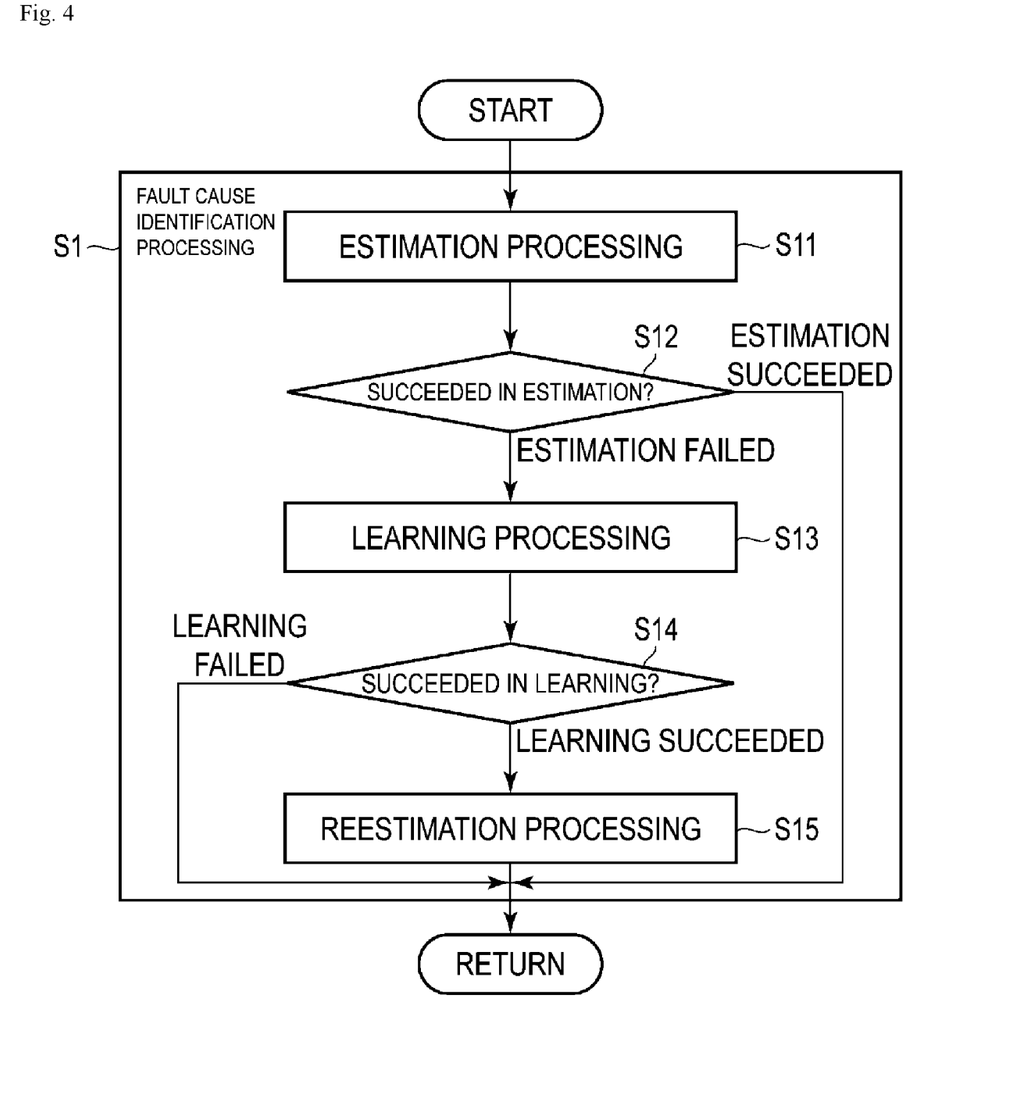
FIG. 4 is a flowchart illustrating an example of a processing procedure and processing contents of fault cause identification processing of the anomaly handling support processing illustrated in FIG. 3.

Under control of the estimation unit 11, the anomaly handling support apparatus 1 first performs processing of identifying a fault cause in step S1 as follows. FIG. 4 is a flowchart illustrating an example of a processing procedure and processing contents thereof.

In other words, the estimation unit 11 acquires, from the data conversion unit 30, event information corresponding to alarm information generated from a node to be monitored, and the topology information corresponding to the configuration information ST of the network acquired from the configuration information database. Then, in step S11, the estimation unit 11 applies the rule sets 21 to 2n managed by the rule engine 20 to the acquired event information and the topology information to perform estimation processing of a fault cause of the node. Then, the estimation unit 11 determines in step S12 whether the fault cause has been estimated based on the estimation result of the estimation processing and ends the processing when the fault cause has been estimated.

In contrast, when the estimation by the existing rule sets has failed, the estimation unit 11 extracts a unique combination of failure events from the event information in step S13, and uses the extracted unique combination as a condition part and fault cause information registered by a maintenance personnel as a conclusion part to perform learning processing. Then, the estimation unit 11 determines, in step S14, whether a new rule has been generated as a result of the learning processing.

As a result of this determination, when a new rule has been generated, the newly generated rule is added to the rule sets 21 to 2n of the rule engine 20, and a rule ID of the newly generated rule is associated with a failure ID and stored in the topology and event data storage unit 13. Then, in step S15, the estimation unit 11 performs the estimation processing of a failure occurrence location based on the newly generated rule again and ends the processing. Note that when a new rule has not been generated in the learning processing (step S13), that is, when the learning processing has failed, the estimation unit 11 ends the processing.

Upon end of the fault cause identification processing described above, the anomaly handling support apparatus 1 determines in step S2 whether a fault cause has been identified. When a fault cause has not been identified, that is, when no fault has occurred, or when a fault cause is difficult to identify even if a fault has occurred, the anomaly handling support apparatus 1 terminates the processing as is.

(2) Determination Processing of Handling Method

When it is confirmed in step S2 that a fault cause has been identified, the anomaly handling support apparatus 1 then performs processing of determining a handling method for the above fault cause. The processing of determining a handling method for a fault cause is processing in which an approach of Bayesian statistics is applied to calculate restoration probabilities for respective handling methods in consideration of prior probabilities, priorities are set for the handling methods based on the calculated restoration probabilities, and a handling method is determined in accordance with the priorities. For a calculation method of the restoration probabilities, there are a first pattern (pattern 1) and a second pattern (pattern 2).

(2-1) Pattern 1

The pattern 1 is directed to a plurality of nodes including not only a target node for which a fault cause has been identified, but also all other nodes each having handling performance for the same fault cause as the above fault cause, and calculates a restoration probability for the same fault cause per handling method to set priorities.

Figure 5:
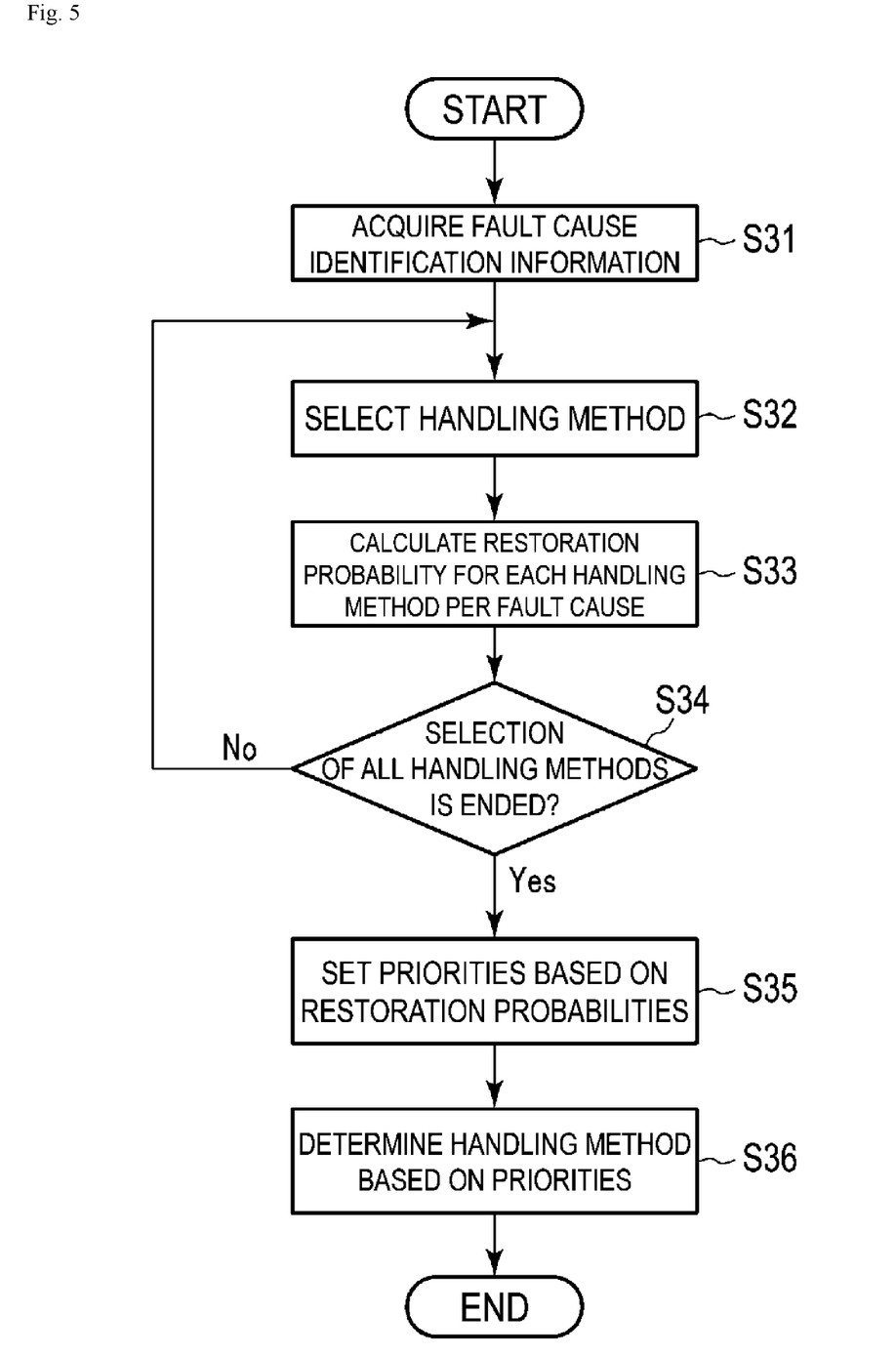
FIG. 5 is a flowchart illustrating a processing procedure and processing contents of a first pattern of handling method determination processing of the anomaly handling support processing illustrated in FIG. 3.

FIG. 5 is a flowchart illustrating an example of a processing procedure and processing contents of handling method determination processing to which the pattern 1 is applied. The handling method determination unit 12 first acquires fault cause identification information from the estimation unit 11 in step S31. The fault cause identification information includes, for example, a number of a node corresponding to a fault occurrence location and identification information (e.g., number) of the fault cause.

The handling method determination unit 12 then selects one of a plurality of handling methods used for the above fault cause in step S32. Then, in step S33, the prior probability of Bayesian statistics is used to calculate a restoration probability for the fault cause per handling method based on the failure case database stored in the topology and event data storage unit 13 by the following expression.

That is, when it is assumed that the fault cause is $X_i$, the handling methods are $A_n$, and the number of types of handling methods is 4, the restoration probability (%) is calculated by:

$$\Sigma P(A_n | X_i) \times 100 \ldots \quad (1)$$

Note that $\Sigma$ means that the restoration probability is calculated for each of n=1 to 4 of the handling methods $A_n$.

Figure 7:
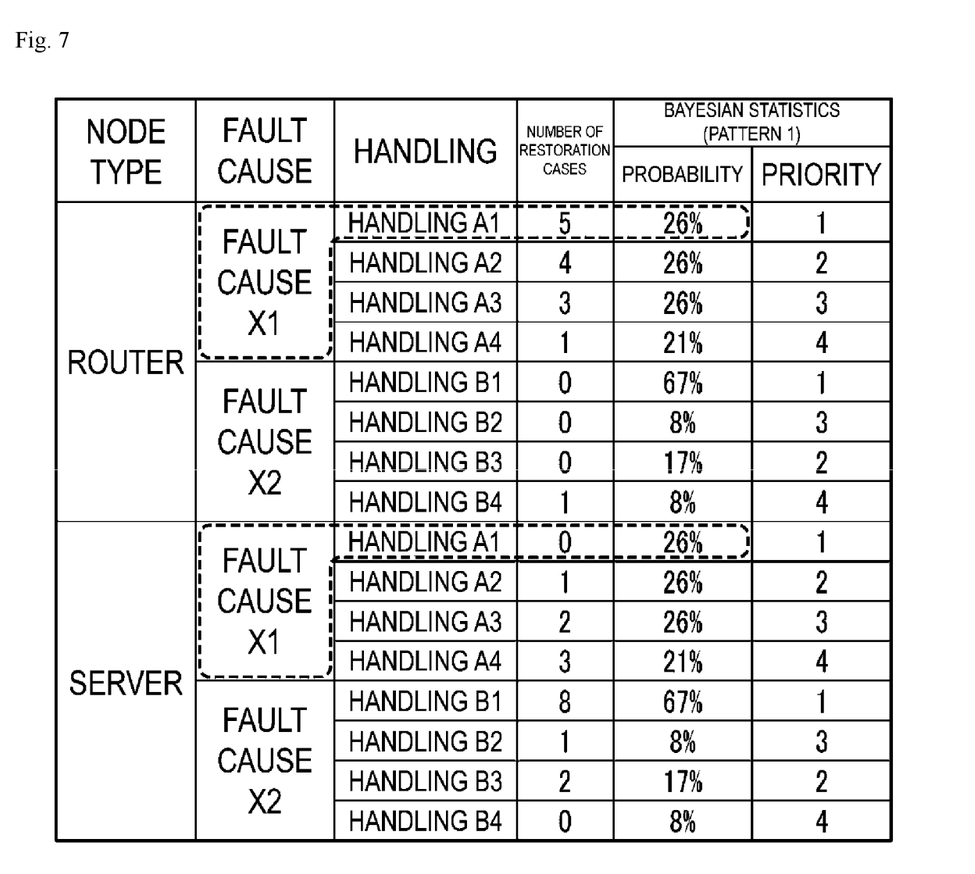
FIG. 7 is a diagram showing an example of processing results by the first pattern of the handling method determination processing illustrated in FIG. 5.

For example, suppose that the fault handling history data as illustrated in FIG. 7 is stored in the failure case database. Then, when it is assumed that the fault cause identified by the estimation unit 11 is X1 in this state, the restoration probability of the handling method A1 for the fault cause X1 is:

$$(5+0)/(5+4+3+1+0+1+2+3) \times 100 = 26\%.$$

The handling method determination unit 12 determines in step S34 whether the calculation of the restoration probability has been performed for all the handling methods $A_n$. When there is a handling method $A_n$ for which the calculation has not been performed yet, the processing returns to step S32 to select the next handling method, and the processing of calculating the restoration probability is repeated in step S33. In this way, the restoration probabilities of the other handling methods A2 to A4 for the fault cause X1 of all the nodes are calculated similarly.

When the calculation of the restoration probability for the fault cause X1 identified by the estimation unit 11 is ended for all the handling methods $A_n$, the handling method determination unit 12 sets priorities for the handling methods $A_n$ in descending order of the restoration probabilities per node based on the calculated restoration probabilities of the respective handling methods $A_n$ in step S35. Then, in step S36, the handling method determination unit 12 selects a handling method having the highest priority in accordance with the set priorities and determines the selected handling method as a presentation target. When a case of FIG. 7 is taken as an example, a handling method A1 having the highest priority is determined to be a presentation target for the fault cause X1.

Note that in a case where calculated restoration probabilities are an identical value, for example, a handling method having a higher rank in consideration of the previous priorities is set to have a higher rank. In addition, in a case where there are a plurality of handling methods having the calculated restoration probabilities that are the highest and an identical value among handling methods, for example, the pattern 2 to be described below may be used to re-calculate restoration probabilities for the plurality of handling methods, thereby setting priorities based on the re-calculated results.

In other words, according to the handling method determination processing by the pattern 1, not only the number of restoration cases per handling method in the past in a target node for which a fault cause has been identified, but also the number of restoration cases per handling method in the past for the same fault cause in all the nodes are taken into account to calculate the restoration probability for each handling method. Accordingly, even when the number of execution times of handling methods in a target node for which a fault cause has been identified is small or there is variation in the number of execution times between the target node and the other nodes, it is possible to select and maintain an optimal handling method for the identified fault cause.

For example, in the example of the fault handling history data in FIG. 7, when the target node for which a fault cause has been identified is a server, the number of restoration cases in the past of the handling method A1 for the fault cause X1 of the server is 0. However, the number of restoration cases in the past of the handling method A1 for the fault cause X1 of a router is 5, that is, the number of performance is large, and thus the number of performance is reflected, whereby the handling method A1 is also selected for the server.

Figure 8:
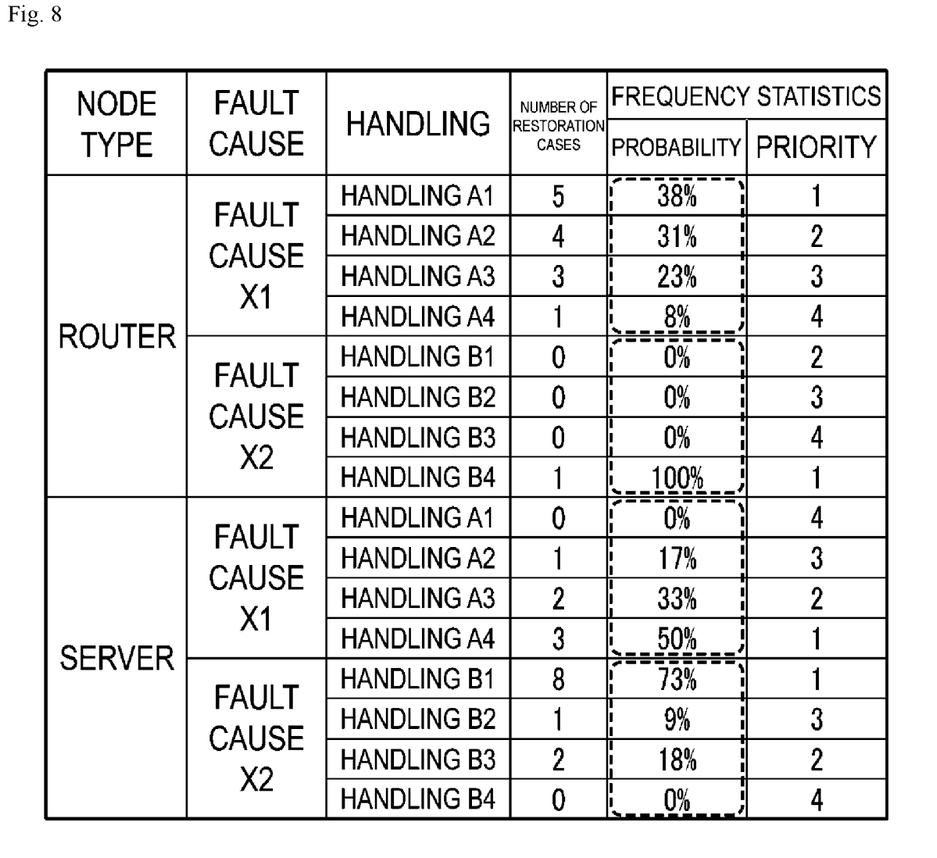
FIG. 8 is a diagram showing an example of processing results by existing handling method determination processing.

Incidentally, when a frequency statistics that is an existing technique is applied, only past performance of restoration in a target node for which a fault cause has been identified is taken into account to calculate restoration probabilities for handling methods and to set priorities, and thus the restoration probabilities and the priorities are as shown in FIG. 8. In this example, in a case where a target node for which a fault cause has been identified is a server, when a handling method for the fault cause X1 is to be presented, a handling method A4 is selected although the number of restoration cases in the past is three that is small.

(2-2) Pattern 2

In the pattern 2, for not only a target node for which a fault cause has been identified but also all nodes of the same type as the target node, a restoration probability per handling method for an identical fault cause is calculated to set priorities.

Figure 6:
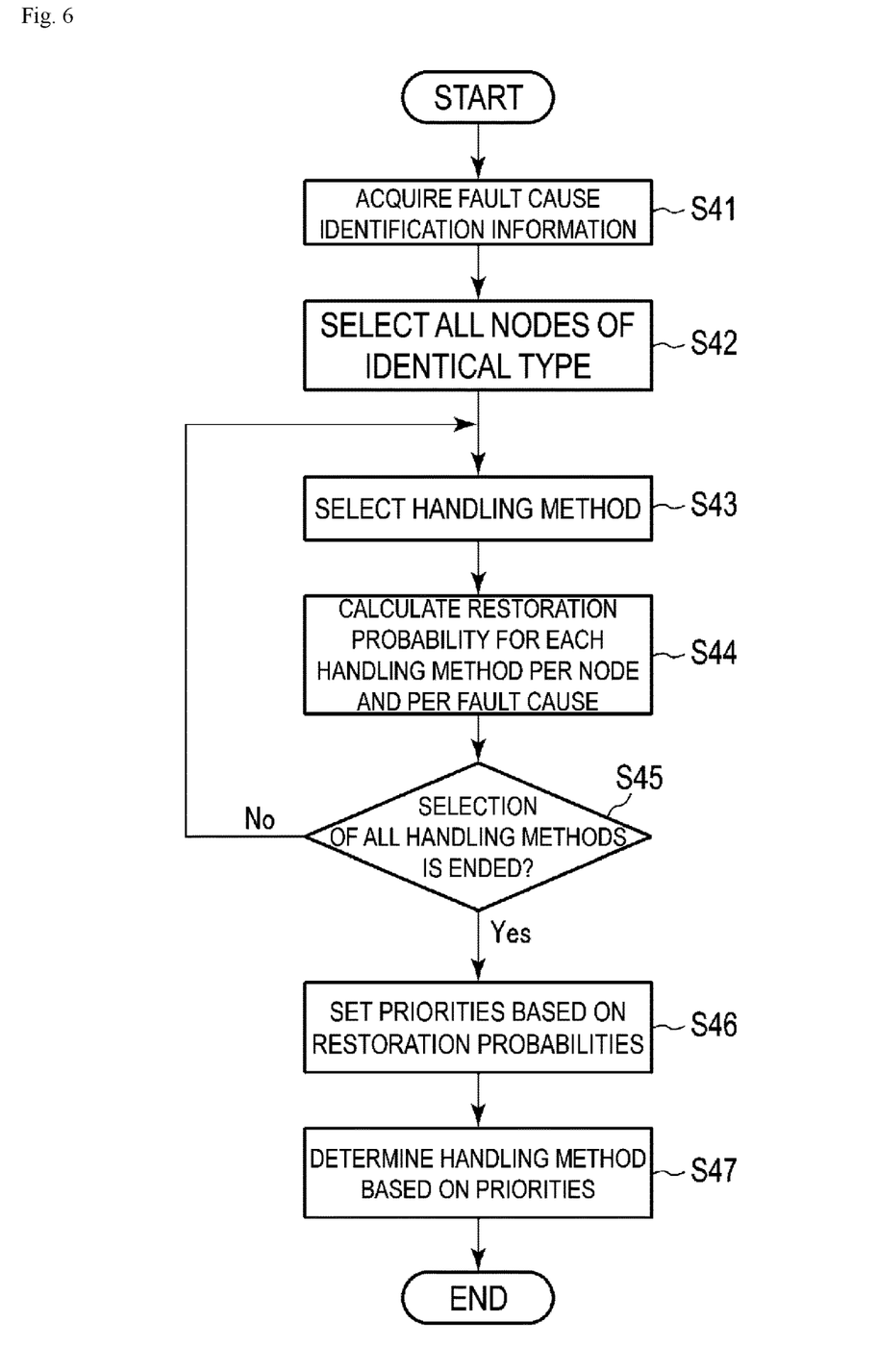
FIG. 6 is a flowchart illustrating an example of a processing procedure and processing contents of a second pattern of the handling method determination processing of the anomaly handling support processing illustrated in FIG. 3.

FIG. 6 is a flowchart illustrating an example of a procedure and processing contents of the handling method determination processing to which the pattern 2 is applied.

The handling method determination unit 12 first acquires fault cause identification information from the estimation unit 11 in step S41. The fault cause identification information includes, for example, information representing a type of a node corresponding to a fault occurrence location, and identification information (e.g., number) of a fault cause.

The handling method determination unit 12 then selects all nodes of the same type as the target node for which the fault cause has been identified and selects one of a plurality of handling methods used in the past for these nodes in step S42. Then, in step S44, the prior probability of Bayesian statistics is used to calculate a restoration probability of each of the handling methods for the fault cause using the following expression based on the fault handling history data stored in the failure case database of the topology and event data storage unit 13.

That is, when it is assumed that the fault cause is Xi, the handling methods are An, the node type is Sj, and the number of handling methods is 4, the restoration probability (%) can be calculated by:

$$\Sigma P(An|Xi,Sj) \times 100 \ldots \quad (2)$$

Note that $\Sigma$ means that the restoration probability is calculated for each of n=1 to 4 of the handling methods An.

Figure 9:
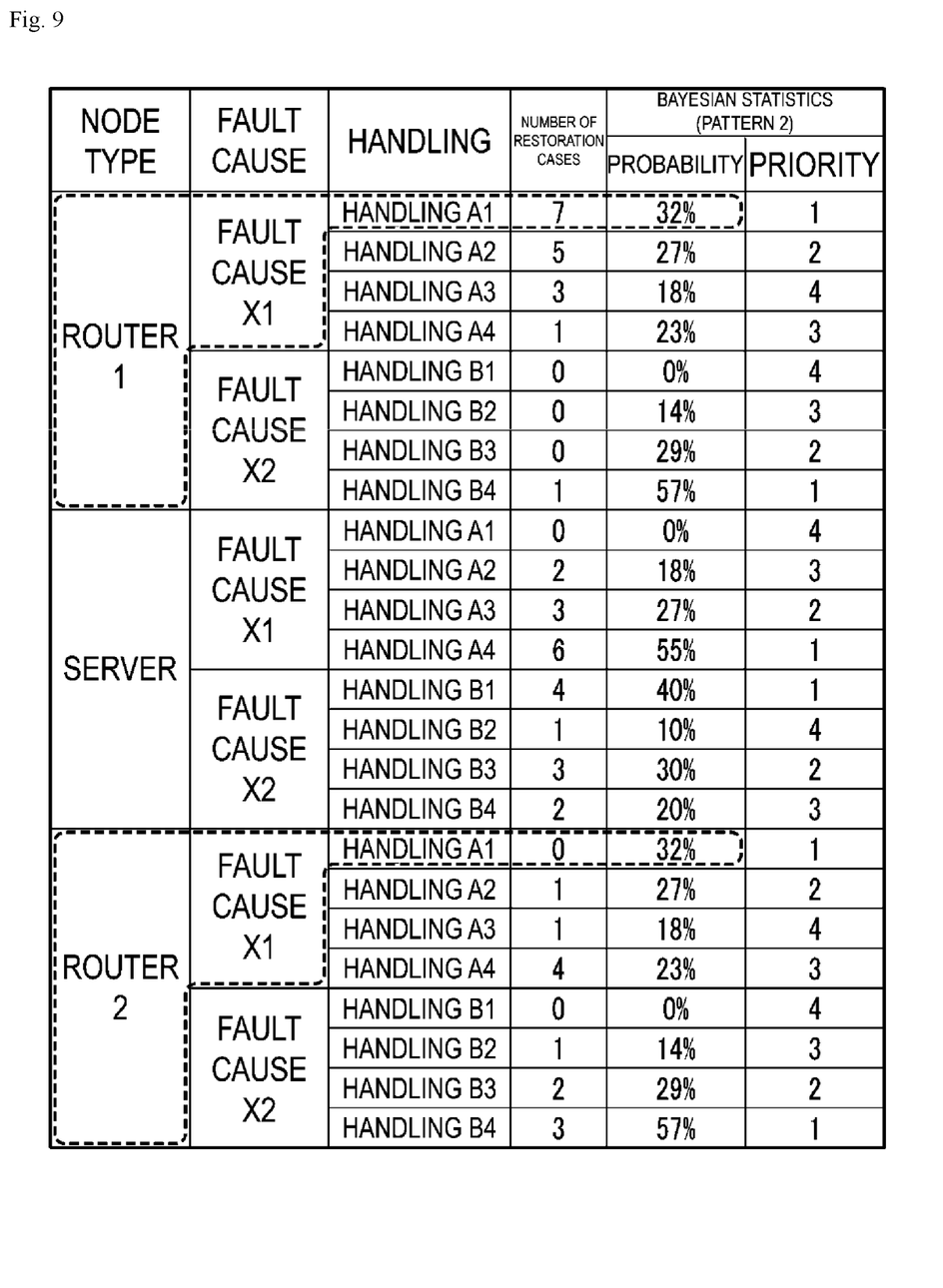
FIG. 9 is a diagram showing an example of processing results by the second pattern of the handling method determination processing illustrated in FIG. 6.

For example, suppose that the fault handling history data as illustrated in FIG. 9 is stored in the failure case database. Then, when it is assumed that the fault cause identified by the estimation unit 11 is X1 and the target node is a router in this state, the restoration probability of the handling method A1 for the fault cause X1 of all routers of the same type as the target node is calculated as follows:

$$(7+0)/(7+5+3+1+0+1+1+4) \times 100 = 32\%.$$

The handling method determination unit 12 determines in step S45 whether the calculation of the restoration probability has been performed for all the handling methods An. When there is a handling method An for which the calculation has not been performed yet, the processing returns to step S43 to select the next handling method and to repeat the processing of calculating the restoration probability in step S44. In this way, restoration probabilities of the other handling methods A2 to A4 for the fault cause X1 of all routers of the same type as the target node are calculated similarly.

When the calculation of restoration probabilities of the handling methods An for the fault cause X1 of all the routers of the same type as the target node for which the fault cause has been identified by the estimation unit 11 is ended, the handling method determination unit 12 sets, in step S46, priorities for the handling methods An corresponding to the fault cause X1 per router in descending order of the restoration probabilities based on the calculated restoration probabilities of the handling methods An.

Then, in step S47, the handling method determination unit 12 selects, in accordance with the set priorities, a handling method having the highest priority among the handling methods An and determines the selected handling method as a presentation target. When a case of FIG. 9 is taken as an example, a handling method A1 having the highest priority is determined to be a presentation target for the fault cause X1 of the router.

Note that, when the calculated restoration probabilities are an identical value in a plurality of handling methods, for example, a handling method having a higher rank in consideration of the previous priorities is set to a higher rank. In addition, in a case where there are a plurality of handling methods having the calculated restoration probabilities that are the highest and an identical value among handling methods, for example, the above-described pattern 1 may be used to re-calculate the restoration probabilities for the plurality of handling methods, thereby setting priorities based on the re-calculated results.

In other words, according to the handling method determination processing by the pattern 2, not only the number of restoration cases per handling method in the past in a target node for which a fault cause has been identified, but also the number of restoration cases per handling method in the past for the same fault cause in the all nodes of the same type as the target node are taken into account to calculate the restoration probability for each handling method. Accordingly, even when the number of execution times of handling methods in a target node for which a fault cause has been identified is small or there is variation in the number of execution times between the target node and the other nodes of the same type, it is possible to select and present an optimal handling method for the identified fault cause.

In addition, by limiting a parameter for calculating the restoration probabilities to the number of restoration cases in nodes of the same type, it is possible to take an adequacy of a handling method for a fault cause per node type into account to calculate restoration probabilities for handling methods and set priorities.

(3) Presentation of handling method

Upon end of the above-described handling method determination processing, the anomaly handling support apparatus 1 determines, in step S4, pass or fail of selection of a handling method, that is, whether a handling method has been determined in the above-described handling method determination processing. As a result of this determination, when a handling method has been determined, handling method presentation information ES is generated in step S5, and the generated presentation information ES of the handling method is output from the GUI 40 to the display unit 8 to be displayed.

In contrast, when no handling method has been determined in the above-described handling method determination processing, in step S6, a message is generated as the presentation information ES that no handling method has been found, and the generated message is output from the GUI 40 to the display unit 8 to be displayed.

Actions and Effects As described above, in the embodiment of the present disclosure, in the anomaly handling support apparatus 1, a prior probability by an approach of Bayesian statistics is used, as described in the pattern 1, for all nodes having handling performance for an identical fault cause stored in the fault handling history data, restoration probabilities of handling methods for the fault cause are calculated, priorities are set for the handling methods based on the calculated restoration probabilities, and a handling method to be presented is determined in accordance with the priorities.

Furthermore, in the embodiment of the present disclosure, in the anomaly handling support apparatus 1, a prior probability by an approach of Bayesian statistics is used, as described in the pattern 2, for all nodes of the same type as the target node for which a fault cause has been identified among nodes stored in the fault handling history data, restoration probabilities of handling methods for an identical fault cause are calculated, priorities are set for the handling methods based on the calculated restoration probabilities, and a handling method to be presented is determined in accordance with the priorities.

Accordingly, according to the embodiment, not only the number of restoration cases per handling method in the past in the target node for which a fault cause has been identified, but also the number of restoration cases per handling method for an identical fault cause in the past for all nodes or all nodes of the same type as the target node are considered to calculate restoration probabilities for the handling methods. Accordingly, even when the number of execution times of handling methods in a target node for which a fault cause has been identified is small or there is variation in the number of execution times between the target node and the other nodes, it is possible to select and maintain an optimal handling method for the identified fault cause.

In addition, according to the pattern 2, by limiting a parameter for calculating restoration probabilities to the number of restoration cases in nodes of the same type, it is possible to take an adequacy of a handling method for a fault cause per node type into account to calculate restoration probabilities for the handling methods and set priorities.

Specific Examples of Effects

FIG. 10 is a diagram showing a comparison example of effects between the handling method determination processing in the embodiment of the present disclosure to which the pattern 1 and pattern 2 of the Bayesian statistics are applied and the processing to which the existing frequency statistics is applied. In the same figure, the number of apparatus types is one, the number of nodes is three, the number of fault causes is three, and the number of handling methods is five, as comparison conditions.

In this comparison example, the number of apparatus types is one and thus the restoration probabilities and the priority ranking between the pattern 1 and the pattern 2 are identical, respectively; however, the restoration probabilities and the priorities to which the Bayesian statistics is applied are directed to all apparatuses (network equipment 1) and the restoration probabilities are calculated per fault cause type using handling results of each handling methods (contents) for the fault cause type as the parameter, so that it is possible to eliminate an effect of variation in restoration performance per node and to select and present a handling method for which a high handling effect is expected, as compared to the case in which the existing frequency statistics is applied.

Figure 11:
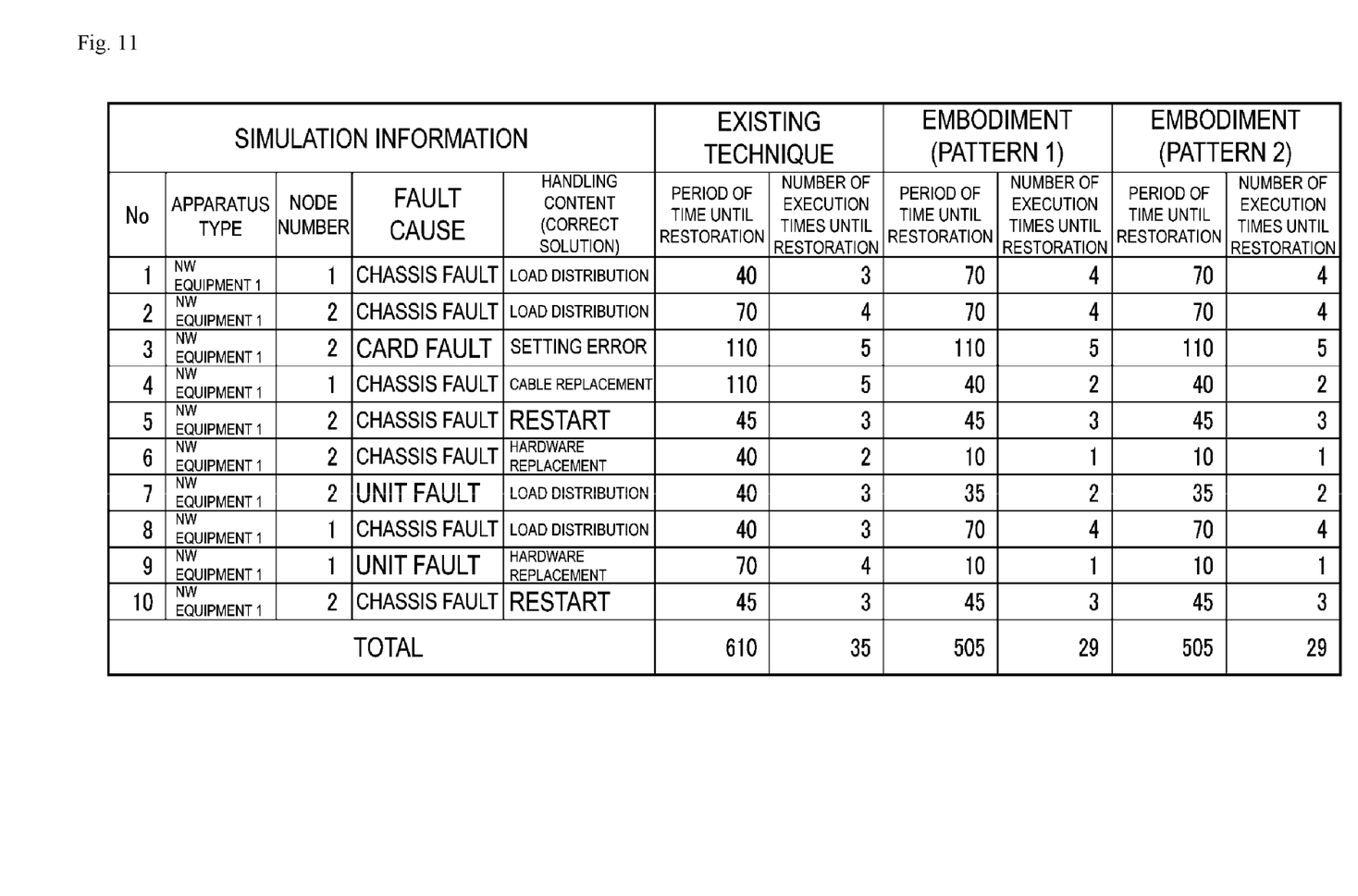
FIG. 11 is a diagram showing simulation results of a period of time and the number of execution times until restoration by the first pattern and the second pattern of the handling method determination processing illustrated in FIGS. 5 and 6 compared with the existing technique.

FIG. 11 shows an example of simulation results of a period of time and the number of execution times for restoration required until a handling result (correct solution) for a fault cause for nodes 1, 2 of the apparatuses (network equipment 1) shown in FIG. 10, and shows the results of a case in which the pattern 1 and the pattern 2 of Bayesian statistics in the embodiment of the present disclosure are applied, in comparison with the results of a case in which the frequency statistics of the existing technique is applied.

As shown in FIG. 11, according to the embodiment of the present disclosure, although there are some cases in which the period of time and the number of handling execution times required until restoration are larger than those of the existing technique, the period of time and the number of handling execution times required until restoration can be smaller than those of the existing technique in many cases.

OTHER EMBODIMENTS (1) Although in the above-described embodiment, the description has been given of the case in which the processing functions of the anomaly handling support apparatus are provided, for example, in a maintenance terminal as an example, the processing functions may be provided in a management server or the like positioned higher in the system. Furthermore, the processing functions of the anomaly handling support apparatus may be provided in any one or more of nodes to be monitored. In any case, the processing functions of the anomaly handling support apparatus has a function of collecting and managing attribute information of each node, information indicating a connection status between nodes, and alarm information generated from each node.

(2) Although in the above-described embodiment, the description has been given of the case in which the handling method determination unit 12 is provided in the rule generation and control unit 10 as an example, the handling method determination unit 12 may be provided in another terminal or a server independently from the rule generation and control unit 10. This configuration can be achieved by enabling communication between the handling method determination unit 12 and an apparatus provided with the rule generation and control unit 10, and acquiring information representing the fault cause identified by the estimation unit 11 and the history information stored in the topology and event data storage unit 13 from the apparatus.

(3) In the above-described embodiment, the description has been given of the case in which a restoration probability is calculated using the same conditions for a plurality of handling methods for a fault cause as an example. However, the present disclosure is not limited thereto, and for example, a cost, a period of time, and other restoration conditions of each of a plurality of handling methods may be taken into account to set weighting coefficients for the handling methods, calculation results of restoration probabilities may be weighed with the weighting coefficients, and degrees of priority may be set for the handling methods based on the weighted restoration probabilities. In this way, for example, priorities can be set for a plurality of handling methods having restoration probabilities that are an identical value, in consideration of the restoration conditions such as a cost or a period of time.

(4) Besides node types, anomaly types and anomaly cause types, types of handling methods, types of statistics using a prior probability, calculation methods of restoration probabilities, setting methods of priorities, determination methods of handling methods, and the like can also be modified in various ways without departing from the gist of the present disclosure.

Also, the embodiments may appropriately be performed in combination as long as possible, and in such a case, combined effects can be obtained. Further, the aforementioned embodiment includes the disclosure in various stages, and various disclosures can be extracted from appropriate combinations of a plurality of disclosed components.

REFERENCE SIGNS LIST

1 Anomaly handling support apparatus
2 Control unit
3 Program storage unit
4 Data storage unit
5 Communication interface unit (communication I/F)
6 Input/output interface unit (input/output I/F)
7 Input unit
8 Display unit
9 Bus
10 Rule generation and control unit
11 Estimation unit
12 Handling method determination unit
13 Topology and event data storage unit
20 Rule engine
30 Data conversion unit
40 Input/output interface unit (GUI)

The invention claimed is:

1. An anomaly handling support apparatus comprising:
a storage medium configured to store pieces of anomaly handling performance information for a plurality of apparatuses connected to a network;
an acquisition unit, including one or more processors, configured to acquire information representing an identification result of an anomaly cause related to an apparatus where an anomaly is occurred among the plurality of apparatuses;
a calculation unit, including one or more processors, configured to calculate, based on the pieces of anomaly handling performance information that are stored, by a statistical approach using a prior probability, for a plurality of apparatuses in a predetermined range including the apparatus that the anomaly cause of the apparatus is identified, restoration probabilities of anomaly causes for a plurality of handling methods corresponding to the anomaly causes of the plurality of apparatuses in the predetermined range;
a priority setting unit, including one or more processors, configured to set degrees of priority for the plurality of handling methods based on the restoration probabilities that are calculated;
a determination unit, including one or more processors, configured to determine a handling method of the plurality of handling methods for the apparatus that the anomaly cause of the apparatus is identified based on the degrees of priority that are set; and
an output interface configured to output information representing the handling method that is determined.

2. The anomaly handling support apparatus according to claim 1, wherein the calculation unit is configured to calculate, based on the pieces of anomaly handling performance information that are stored, for a plurality of apparatuses including the apparatus that the anomaly cause of the apparatus is identified and another apparatus having a handling performance for an anomaly cause identical to the anomaly cause as targets, restoration probabilities of fault causes for a plurality of handling methods corresponding to the fault causes of the plurality of apparatuses as the targets.

3. The anomaly handling support apparatus according to claim 1, wherein the calculation unit is configured to calculate, based on the pieces of anomaly handling performance information that are stored, for a plurality of apparatuses including the apparatus that the anomaly cause of the apparatus is identified and another apparatus of an identical type as the apparatus as targets, restoration probabilities of fault causes for a plurality of handling methods corresponding to the fault causes of the plurality of apparatuses as the targets.

4. The anomaly handling support apparatus according to claim 2, wherein the calculation unit is configured to re-calculate, when there are handling methods having an identical restoration probability among the plurality of handling methods, a restoration probability for at least the handling methods.

5. An anomaly handling support method performed by an information processing apparatus including a hardware processor and a memory, the anomaly handling support method comprising:
storing pieces of anomaly handling performance information for a plurality of apparatuses connected to a network in the memory;
acquiring information representing an identification result of an anomaly cause related to an apparatus where an anomaly is occurred among the plurality of apparatuses;
calculating, based on the pieces of anomaly handling performance information that are stored, by a statistical approach using a prior probability, for a plurality of apparatuses in a predetermined range including the apparatus that the anomaly cause of the apparatus is identified, restoration probabilities of anomaly causes for a plurality of handling methods corresponding to the anomaly causes of the plurality of apparatuses in the predetermined range;

setting degrees of priority for the plurality of handling methods based on the restoration probabilities that are calculated;

determining a handling method of the plurality of handling methods for the apparatus that the anomaly cause of the apparatus is identified based on the degrees of priority that are set; and outputting information representing the handling method that is determined.

6. The anomaly handling support method according to claim 5, comprising:

calculating based on the pieces of anomaly handling performance information that are stored, for a plurality of apparatuses including the apparatus that the anomaly cause of the apparatus is identified and another apparatus having a handling performance for an anomaly cause identical to the anomaly cause as targets, restoration probabilities of fault causes for a plurality of handling methods corresponding to the fault causes of the plurality of apparatuses as the targets.

7. The anomaly handling support method according to claim 5, comprising:

calculating, based on the pieces of anomaly handling performance information that are stored, for a plurality of apparatuses including the apparatus that the anomaly cause of the apparatus is identified and another apparatus of an identical type as the apparatus as targets, restoration probabilities of fault causes for a plurality of handling methods corresponding to the fault causes of the plurality of apparatuses as the targets.

8. The anomaly handling support method according to claim 5, comprising:

re-calculating, when there are handling methods having an identical restoration probability among the plurality of handling methods, a restoration probability for at least the handling methods.

9. A non-transitory computer readable medium storing one or more instructions that cause a computer to execute:

storing pieces of anomaly handling performance information for a plurality of apparatuses connected to a network in a memory;

acquiring information representing an identification result of an anomaly cause related to an apparatus where an anomaly is occurred among the plurality of apparatuses;

calculating, based on the pieces of anomaly handling performance information that are stored, by a statistical approach using a prior probability, for a plurality of apparatuses in a predetermined range including the apparatus that the anomaly cause of the apparatus is identified, restoration probabilities of anomaly causes for a plurality of handling methods corresponding to the anomaly causes of the plurality of apparatuses in the predetermined range;

setting degrees of priority for the plurality of handling methods based on the restoration probabilities that are calculated;

determining a handling method of the plurality of handling methods for the apparatus that the anomaly cause of the apparatus is identified based on the degrees of priority that are set; and outputting information representing the handling method that is determined.

10. The non-transitory computer readable medium according to claim 9, wherein the or more instructions cause the computer to execute:

calculating based on the pieces of anomaly handling performance information that are stored, for a plurality of apparatuses including the apparatus that the anomaly cause of the apparatus is identified and another apparatus having a handling performance for an anomaly cause identical to the anomaly cause as targets, restoration probabilities of fault causes for a plurality of handling methods corresponding to the fault causes of the plurality of apparatuses as the targets.

11. The non-transitory computer readable medium according to claim 9, wherein the or more instructions cause the computer to execute:

calculating, based on the pieces of anomaly handling performance information that are stored, for a plurality of apparatuses including the apparatus that the anomaly cause of the apparatus is identified and another apparatus of an identical type as the apparatus as targets, restoration probabilities of fault causes for a plurality of handling methods corresponding to the fault causes of the plurality of apparatuses as the targets.

12. The non-transitory computer readable medium according to claim 9, wherein the or more instructions cause the computer to execute:

re-calculating, when there are handling methods having an identical restoration probability among the plurality of handling methods, a restoration probability for at least the handling methods.

\* \* \* \* \*